United States Patent Office 3,460,909
Patented Aug. 12, 1969

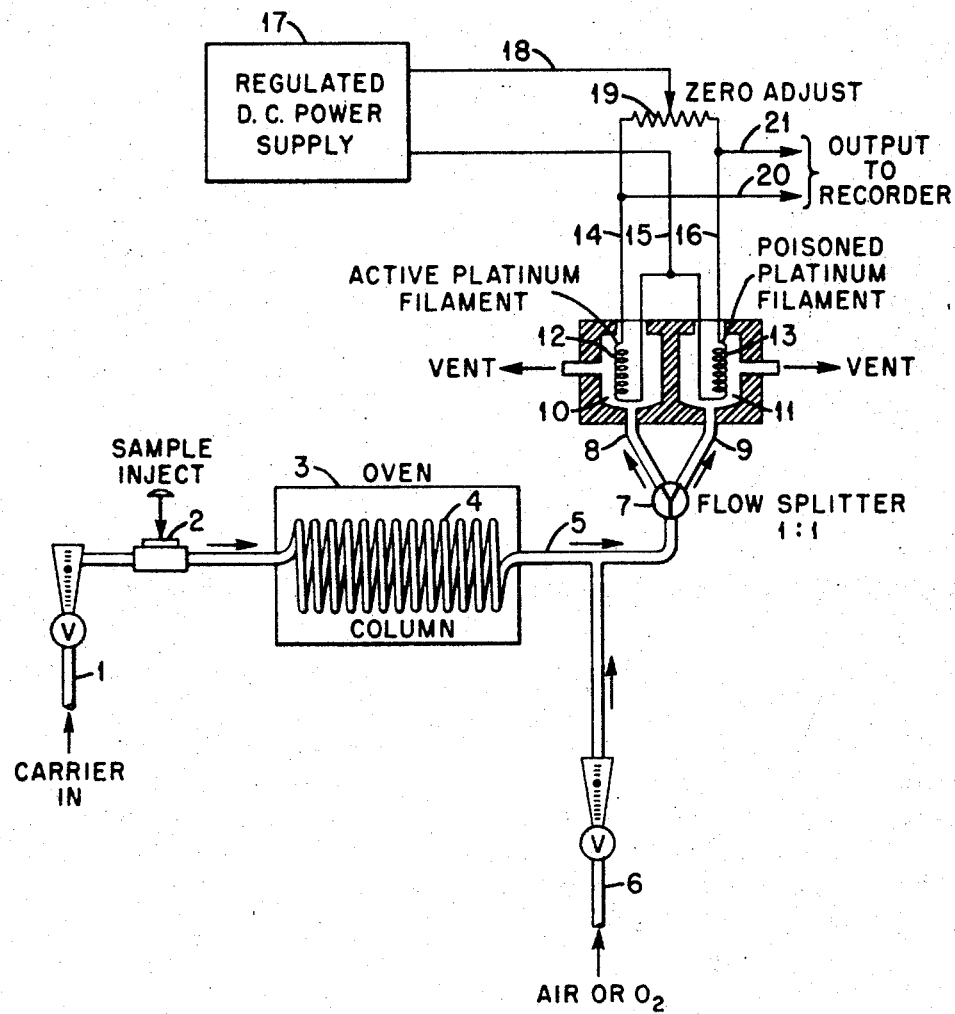

3,460,909
CATALYTIC COMBUSTION DETECTOR FOR GAS CHROMATOGRAPHY
Tom M. Gayle, Oak Ridge, Tenn., assignor to the United States of America as represented by the United States Atomic Energy Commission
Filed Aug. 4, 1965, Ser. No. 477,335
Int. Cl. G01n *31/12, 31/08*
U.S. Cl. 23—254      4 Claims

ABSTRACT OF THE DISCLOSURE

A thermal conductivity compensation means for a catalytic combustion detector which comprises means for dividing the input gas flow to the detector into two equal portions, means for passing a first portion of the gas over a heated active platinum filament of the detector and passing a second portion of the gas over a heated deactivated (i.e. vanadium pentoxide poisoned) platinum compensating filament. Combustion occurs only at the active filament and the thermal conductivity signals of the two filaments tend to cancel, as well as any variation in signals due to changes in power supply or ambient temperature, and the output of a bridge circuit connected to the two filaments closely represents that of combustion only.

---

It is common practice in gas chromatography analytical techniques to couple a catalytic combustion detector with a separation column in order to supplement the katharometer cell commonly used in the prior art. This technique has been seriously limited in its application to quantitative analysis due to its sensitivity to extraneous variables. One of the most serious problems is that the platinum filament used in the catalytic combustion cell responds not only to the combustion reaction it initiates, but also responds to thermal conductivity variations. In some instances, the catalytic response is completely masked by the thermal conductivity response.

The usual prior system using a catalytic detector with a separation column includes a combustion detector filament consisting of a coiled platinum wire of low resistance exposed to the column effluent, and a compensating reference filament which is usually sealed in inert gas or it may be exposed to atmosphere. Oxygen or air, when not present in the carrier gas, is introduced between the column and the combustion detector to enable combustion to take place. Combustible gas, eluted from the column, is passed to the heated platinum combustion detector filament where a combustion reaction occurs. The heat liberated in the ensuing reaction raises the filament temperature further. The resulting resistive unbalance between the combustion detector filament and the reference filament is reflected in the output of a bridge circuit connected to the respective filaments and the output signal from the bridge circuit is, ideally, proportional to the amount of combustible gas contained in the band eluted from the column. The usual detector filament response is affected not only by the combustible gas present, but also by the thermal conductivity of the gas mixture surrounding the filament. However, in the above-described prior system, the reference filament can only compensate for variations in power supply and ambient temperature and provides no compensation for the thermal conductivity of the gas mixture surrounding the detector filament. Therefore, there exists a need for some means whereby the reference filament in the bridge circuit would respond to all the properties of the sample except the single characteristic desired to be measured by the detecting element.

With a knowledge of the limitations of prior systems, as discussed above, it is a primary object of the present invention to provide a catalytic combustion detector system for use with a separation column which includes means for compensating for the effects that the thermal conductivity of the gas has on the measuring accuracy of the system.

It is another object of the present invention to provide a system as in the preceding object wherein not only thermal conductivity is compensated for, but also variations in power supply and ambient temperature are compensated for, such that a single desired characteristic of the sample mixture is measured by the detecting element of the system.

These and other objects and advantages of the present invention will become apparent upon a consideration of the following detailed specification and the accompanying drawing wherein:

The single figure is a schematic diagram of a catalytic combustion detector system for use with a separation column of a gas chromatography system.

The above objects have been accomplished in the present invention by providing a thermal conductivity compensation means for a catalytic combustion detector which comprises dividing the gas flow to the detector into two equal portions, passing a first portion of said gas over a heated active platinum filament of the detector and passing a second portion of said gas over a heated deactivated platinum compensating filament. Thus, the detector filament and the compensating filament see the same mixture of gases under identical conditions except that combustion occurs at the detector filament and not at the compensating filament. The thermal conductivity signals of the two filaments tend to cancel as well as any variation in signals due to changes in power supply or ambient temperature and the output of a bridge circuit connected to the two filaments closely represents that of combustion only.

Referring now to the single figure of the drawing, a carrier gas is fed through a tubing 1, a valve and metering device, and through a sample inject device 2 to a separation column 4 disposed in an oven 3. The output of the column 4 is fed through a tubing 5 to a flow splitter 7 which equally divides the flow from pipe 5 to a tube 8 connected to a combustion detector chamber 10 and to a tube 9 connected to a compensation chamber 11. Oxygen or air, when not present in the carrier gas, is introduced into the pipe 5 through a tube 6 and a conventional valve and metering device. An active, heated platinum filament 12 is disposed in chamber 10, and a heated deactivated compensation platinum filament 13 is disposed in chamber 11. A regulated D.C. power supply 17 is connected by means of a lead 15, a lead 18, a potentiometer 19, and leads 14 and 16 to the filaments 12 and 13 in a bridge circuitry. The output of the bridge circuitry is connected through leads 20 and 21 to a suitable recorder.

By dividing the gas flow from tubing 5 into two equal portions, passing a first portion of the gas over the heated active filament 12 and passing a second portion of the gas over the heated deactivated filament 13, the two filaments see the same mixture of gases under identical conditions except that combustion occurs at the filament 12 and not at the filament 13. The thermal conductivity signals of the two filaments as well as the signals caused by any variations in power supply or ambient temperature tend to cancel and the output of the bridge circuitry closely represents that of combustion only, as mentioned above.

The filament 13 in the compensation chamber 11 is deactivated by the use of a suitable poison. Since combustion temperatures in excess of 800° C. are sometimes employed, the only poison that has been found to be satisfactory for the reference filament 13 is vanadium pentoxide at these temperatures. The usual platinum poisons i.e., sulfur, arsenic, halogen and halogenated hydrocarbons, all provide deactivation of the platinum, but none of these poisons provide stable deactivation at temperatures of 800° C. and above. On the other hand, the $V_2O_5$, applied to a heated filament as a saturated aqueous solution, provides stable deactivation of the platinum filament in excess of 1000° C.

The operation of the present invention was compared with the prior art system described above. Several runs were made using a gas chromatograph in combination with a catalytic combustion chamber of the prior art and with a catalytic combustion chamber as in the present invention. Known quantities of hydrogen and helium in air were passed through a chromatographic column heated to a temperature of 100° C. The column was prepared by packing a 25-mm. stainless steel tube with a molecular sieve material. The hydrogen was adsorbed on the column. By flushing the column with helium, the hydrogen was removed as a band. The flow from the column was diluted with air and, in the present system, the stream split equally, one leg going to the combustion detector cell and the other leg to the reference cell. In the prior art system, the eluted gas was diluted with air and sent directly to the catalytic combustion cell. The platinum filaments in both systems were heated to a common testing temperature by a D.C. power supply.

Results of a typical run comparing the two arrangements showed an uncompensated cell output of 0.2 millivolt for the prior art system, while the compensated cell output of the present invention was better than 0.8 millivolt for the hydrogen peak. Thus, the detection accuracy of the present invention for hydrogen in the presence of helium and air was improved by better than 400% over the prior art system.

The very high thermal conductivity of the hydrogen and the helium tended to partially mask the catalytic response when the prior art uncompensated combustion detector cell was used. The same cell used with the compensation cell of the present invention, with the filament 13 properly poisoned with $V_2O_5$, provided a signal much more closely proportional to the hydrogen concentration. In extreme cases, the elution of hydrogen went undetected in uncompensated cells but was invariably detected in the compensated units. Runs using various other gaseous mixtures also showed equally improved detection accuracy with the present invention as compared with the prior system.

The present invention has been described by way of illustration rather than by limitation and it should be apparent that this invention is equally applicable in fields other than those described. For example, the present invention may be used for the detection of combustible gases in refineries, mines, liquid storage tanks, etc.

What is claimed is:

1. An improved catalytic combustion detector system for monitoring the column effluent from a separation column of a chromatographic device comprising means for splitting said effluent, and means for feeding one split portion through a combustion detector chamber and the other split portion through a compensating chamber in equal quantities, means for also feeding a source of oxygen simultaneously with said effluent into said chambers, each of said chambers being provided with a platinum filament, said detector chamber filament being active and said compensating chamber filament being poisoned with vanadium pentoxide, a source of D.C. voltage connected across said filaments in a bridge circuit for heating said filaments, and recorder means connected to the output of said bridge circuit for providing an accurate indication of the combustion that occurs in said detector chamber while any thermal conductivity signals that appear in both chambers cancel each other.

2. The combustion detector system set forth in claim 1 wherein said filaments are heated to a selected temperature in the range from 800° C. to 1000° C.

3. A combustion detector system for monitoring a source of gas for its hydrogen content thereof comprising a combustion chamber, a compensating chamber, means for splitting said gas, and means for feeding one split portion through said combustion chamber and the other split portion through said compensating chamber in equal quantities, means for also feeding a source of oxygen simultaneously with said gas into said chambers, each of said chambers being provided with a platinum filament, said combustion chamber filament being active and said compensating chamber filament being poisoned with vanadium pentoxide, a source of D.C. voltage connected across said filaments in a bridge circuit for heating said filaments, and recorder means connected to the output of said bridge circuit for providing an accurate indication of the combustion that occurs in said combustion chamber, while any thermal conductivity signals that appear in both chambers cancel each other.

4. The system set forth in claim 3, wherein said filaments are heated to a selected temperature in the range from 800° C. to 1000° C.

References Cited

UNITED STATES PATENTS 2,901,329  8/1959  Kapff.

OTHER REFERENCES

Maxted, E. B., Chemical Abstracts, vol. 42, pp. 7149–7150 (1948).

MORRIS O. WOLK, Primary Examiner

ELLIOTT A. KATZ, Assistant Examiner

U.S. Cl. X.R.

23—232